(12) United States Patent
Nyland et al.

(10) Patent No.: US 11,333,566 B2
(45) Date of Patent: May 17, 2022

(54) ELECTRONIC DEVICE WITH AN INTEGRATED PRESSURE SENSOR

(71) Applicant: Apple Inc., Cupertino, CA (US)

(72) Inventors: Eric N. Nyland, Santa Clara, CA (US); Devon A. Monaco, San Jose, CA (US); Christopher R. Xydis, San Francisco, CA (US); Alan Wu, Santa Clara, CA (US); Dominic P. Cincione, San Francisco, CA (US); Timothy S. Lui, Cupertino, CA (US); Aaron H. Squier, San Francisco, CA (US); Lindsay M. Alanen, San Jose, CA (US); Lucy Elizabeth Browning, San Francisco, CA (US); Richard Hung Minh Dinh, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 577 days.

(21) Appl. No.: 16/124,165

(22) Filed: Sep. 6, 2018

(65) Prior Publication Data

US 2020/0080908 A1 Mar. 12, 2020

(51) Int. Cl.
*G01L 19/00* (2006.01)
*H04R 1/02* (2006.01)
*G01K 1/14* (2021.01)

(52) U.S. Cl.
CPC .......... *G01L 19/0046* (2013.01); *G01K 1/14* (2013.01); *H04R 1/028* (2013.01)

(58) Field of Classification Search
CPC ...... G06F 1/163; G06F 1/1656; G06F 1/1643; G06F 1/169; G06F 2200/1633;
(Continued)

(56) References Cited

U.S. PATENT DOCUMENTS 6,219,304 B1 * 4/2001 Mignot ................. G04C 21/00
368/88
8,371,176 B2 * 2/2013 Rozgo ................. G01L 19/0046
73/756
(Continued)

FOREIGN PATENT DOCUMENTS

CN 104812194 A 7/2015
CN 105101717 A 11/2015
(Continued)

OTHER PUBLICATIONS

Evaluation Report of Utility Model Patent for Chinese Utility Model Application No. ZL2019203000529, dated Oct. 14, 2019 (7 pp.).

(Continued)

*Primary Examiner* — David Z Huang
*Assistant Examiner* — Gedeon M Kidanu
(74) *Attorney, Agent, or Firm* — Dorsey & Whitney LLP

(57) ABSTRACT

This application relates to a portable electronic device that includes an integrated pressure sensor. The portable electronic device includes a housing that defines a cavity with a number of components disposed therein. The cavity is sealed to form a volume of air within the cavity that is vented to the external environment through a barometric vent fluidly coupled to a first opening in the housing. A sensor measures a characteristic of a second volume of air within an isolated chamber that is vented to the external environment through a second opening in the housing. The second volume of air is isolated from the first volume of air within the housing of the portable electronic device. In some embodiments, the portable electronic device is a mobile phone and the sensor is a pressure transducer.

10 Claims, 8 Drawing Sheets

(58) Field of Classification Search
CPC ..... G06F 3/015; G06F 3/016; G01L 19/0069;
G01L 19/143; G01L 9/0044; G01L
19/0046; G01L 19/0645; G01L 19/0672;
G01N 27/121; G04B 39/02; G04B 3/04;
G04G 13/00; G04G 17/02; G04G 21/025;
Y10T 29/49826; H04R 2499/11; H04R
1/023; H04R 1/086; H04R 2231/001;
H04R 2307/025; H04R 2307/204; H04R
2499/13; H04R 31/003; H04R 7/20;
H04R 1/44; H04R 1/028; B29K 2463/00;
B29K 2627/18; B29K 2995/0065; B29K
2995/0069; B29L 2031/3481; G01K 1/14
See application file for complete search history.

(56) References Cited

U.S. PATENT DOCUMENTS

| 9,254,995 | B2 | 2/2016 | Bolognia et al. | |
| 9,529,391 | B2* | 12/2016 | Ely | G06F 1/1656 |
| 9,625,944 | B2* | 4/2017 | Weber | G06F 1/163 |
| 2010/0300207 | A1* | 12/2010 | Ding | G01L 19/143 |
| | | | | 73/721 |
| 2015/0102437 | A1* | 4/2015 | Liu | G01L 9/0073 |
| | | | | 257/419 |
| 2015/0295617 | A1* | 10/2015 | Lai | H04B 1/3888 |
| | | | | 455/575.8 |
| 2016/0058375 | A1* | 3/2016 | Rothkopf | G06F 3/015 |
| | | | | 600/301 |
| 2017/0030851 | A1* | 2/2017 | Kardassakis | G08B 21/20 |
| 2017/0038880 | A1 | 2/2017 | Kinzer et al. | |
| 2017/0041706 | A1* | 2/2017 | Evans | H04R 1/086 |
| 2017/0089698 | A1 | 3/2017 | Ehman et al. | |
| 2017/0094796 | A1* | 3/2017 | Lor | H05K 3/284 |
| 2017/0142524 | A1 | 5/2017 | Sooriakumar et al. | |
| 2017/0181303 | A1* | 6/2017 | Li | B29C 45/1671 |
| 2017/0201826 | A1* | 7/2017 | Zhang | H05K 5/0213 |
| 2018/0035203 | A1* | 2/2018 | Hirai | H04R 1/086 |
| 2018/0063634 | A1* | 3/2018 | Dave | H04R 1/2849 |

FOREIGN PATENT DOCUMENTS

| CN | 105791476 A | 7/2016 |
| CN | 106444975 A | 2/2017 |
| CN | 108391188 A | 8/2018 |
| KR | 1020170098122 A | 8/2017 |

OTHER PUBLICATIONS

PCT International Search Report for PCT International Application No. PCT/US2019/018333, dated Jun. 12, 2019, 3 pages.
'iPhone 7 Plus Teardown', (https://ko.ifixit.com/Teardown/iPhone+7+Plus+Teardown/67384), Sep. 15, 2016, pp. 1-18.
Chipworks, "Apple iPhone 6s", (http://www.chipworks.com/sies/default/files/Apple_iPhone_6s_A1688_Smartphone_Chipworks_Teardown_Report_BPT-1509-801_with_Commentary.pdf), Oct. 2015, pp. 1-68.

* cited by examiner

ELECTRONIC DEVICE WITH AN INTEGRATED PRESSURE SENSOR

FIELD

The described embodiments relate generally to portable electronic device architectures. More particularly, the present embodiments relate to the integration of a pressure sensor within a portable electronic device.

BACKGROUND

Mobile phones, tablet computers, wearable devices, and the like are relied on by billions of people worldwide. People wake up and immediately look to their phone or tablet to read the morning news or check their electronic mail. These devices travel with people out of their house on the way to work, updating people with bus routes, traffic updates, scores for the day's games, and so forth. Applications have been developed to provide health notifications related to a user's daily exercise, track a user's location throughout the day, and share geo-tagged photos on various social media accounts. These applications are enabled by various sensors embedded within the portable electronic devices, such as a global positioning system (GPS) sensor, an accelerometer, a gyroscope, an optical heartbeat monitor, a pressure sensor, temperature sensors, and the like.

As users rely more and more on these devices, the devices are designed to be more robust. For example, plastic components may be replaced by metal components or glass components may be thicker and made with tempered glass. The devices are also designed to be used in a wider variety of environments. For example, devices may commonly be carried on mountaineering or skiing/trekking trips where temperatures drop well below freezing, or devices may commonly be taken in or around water. For this reason, the devices are typically designed to have some level of water resistance because water can lead to failures in the electrical components within the devices.

However, sealing the device so that the device can be submerged, to at least some degree, in water can have unintended consequences that affect the operation of some of the sensors included in the device. For example, sealing the device can lead to an increase in operating temperature as components are potted or enclosed within a sealed environment. As another example, sensors, such as temperature sensors or pressure transducers, can be less accurate because they are sealed within the device and not in direct contact with the external environment. Therefore, what is desired is an improved way to integrate various sensors in a portable electronic device.

SUMMARY

This paper describes various embodiments that relate to a portable electronic device (e.g., mobile phone, tablet computer, etc.) that includes an integrated pressure sensor. The portable electronic device includes a housing that defines a cavity with a number of components disposed therein. The cavity is sealed to form a volume of air within the cavity that is vented to the external environment through a barometric vent fluidly coupled to a first opening in the housing. A sensor (e.g., a pressure sensor) measures a characteristic of a second volume of air within an isolated chamber that is vented to the external environment through a second opening in the housing. The second volume of air is isolated from the first volume of air within the housing of the portable electronic device.

In some embodiments, a portable electronic device is disclosed that includes a number of components disposed within a sealed cavity of a housing. The portable electronic device includes a barometric vent disposed in a first port fluidly coupled to a first opening in the housing of the portable electronic device that permits a fluid within the sealed cavity to equalize with a fluid in an environment external to the housing of the portable electronic device and a sensor disposed in a second port fluidly coupled to a second opening in the housing of the portable electronic device. The first port is isolated from the second port.

In some embodiments, the sensor is a pressure transducer. The pressure transducer can be a microelectromechanical system (MEMS) device encased in a gel to protect the sensor from liquids. In other embodiments, the sensor is a temperature sensor. In some embodiments, the portable electronic device can include multiple sensors disposed in multiple ports of the housing that are isolated from the sealed cavity.

In some embodiments, the sensor is disposed behind a secondary barometric vent included in the second port. The secondary barometric vent is configured to prevent liquid from contacting the sensor. In some embodiments, the second port is located proximate a user interface element disposed in an opening of the housing of the portable electronic device.

In some embodiments, the number of components disposed within the sealed cavity can include one or more of a processor, a memory, a printed circuit board, or an energy storage device. In some embodiments, the cavity is sealed with an adhesive disposed between a surface of the housing and a corresponding surface of a display assembly of the portable electronic device.

In some embodiments, the second port is fluidly coupled to a third port via a fluid channel. An audio transducer can be disposed within the third port behind a secondary barometric vent.

In some embodiments, the barometric vent comprises a polytetrafluoroethylene membrane having a particular depth rating that is incompatible with a desired time constant of the sensor. The depth rating is a characterization of the ability of the polytetrafluoroethylene membrane to resist penetration of a liquid at a particular pressure differential across the membrane. The time constant of the sensor is a characterization of the response time of the sensor to changes in the measured medium.

In some embodiments, a housing of a portable electronic device is disclosed. The housing includes an aluminum substrate having a cavity formed therein and a number of openings in one or more external surfaces of the aluminum substrate. Each opening in the number of openings leads to a port within the aluminum substrate. The housing includes a first opening leading to a first port fluidly coupled to the cavity and a second opening leading to a second port that is isolated from the first port. The first port is configured to include an air-permeable membrane capable of venting a gas in the cavity to an external environment, and the second port is configured to include a sensor.

In some embodiments, the first opening is located on a first surface of the housing and the second opening is located on a second surface of the housing. The second port can be located behind a user interface element disposed within the second opening. In some embodiments, the cavity is sealed via an adhesive bond between a surface of the housing and a surface of a display assembly.

In some embodiments, a mobile phone is disclosed that includes: a display assembly adhesively bonded to a housing to form a sealed cavity, operational components disposed in the sealed cavity, a primary barometric vent, and a sensor. The operational components including a processor, a memory, and an energy storage device. The primary barometric vent is disposed within a first port that fluidly couples the cavity with an external environment. The sensor is disposed within a second port that fluidly couples the sensor with the external environment, the second port isolated from air within the sealed cavity.

In some embodiments, the mobile phone further includes an audio transducer disposed within a third port fluidly coupled to the second port via a fluid channel formed in the housing. In some embodiments, the mobile phone further includes a second sensor disposed within a third port that fluidly couples the second sensor with the external environment, the third port isolated from air within the sealed cavity. In some embodiments, the sensor is a pressure transducer and the second sensor is a temperature sensor.

In some embodiments, a geometry of the first port and a geometry of the second port are designed to promote evacuation of liquid from the ports. In some embodiments, the sensor is disposed behind a secondary barometric vent included in the second port.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
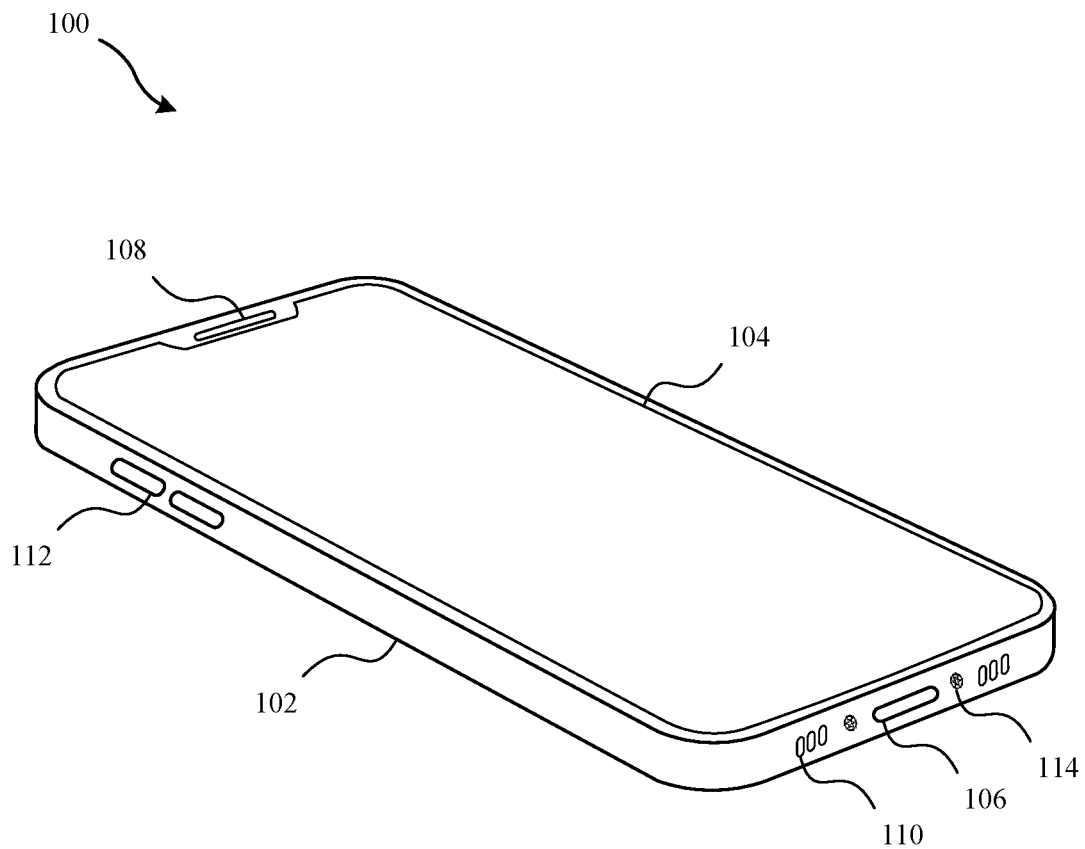
FIG. 1 illustrates a portable electronic device, in accordance with some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Sensors are typically included within a cavity of a housing for a portable electronic device. The cavity can be sealed by applying an adhesive around a perimeter of the cavity to bond a second component, such as a display assembly or glass substrate, to the housing thereby enclosing the cavity. The sealed cavity requires a barometric vent to allow gas to flow into or out of the cavity from an external environment. Failure to provide the barometric vent could lead to failures when the gas inside the cavity expands due to changing temperature. Furthermore, failures can also occur if the flow rate of the barometric vent is not sufficient to compensate for a rapid rise in pressure differential between the air in the cavity and the air in the external environment.

The design of the barometric vent can limit the effectiveness of the water resistance of the device. A barometric vent that responds quickly to changes in pressure differential between the air in the cavity and air in the external environment may not have great water resistance capabilities. However, a barometric vent that has better water resistance capabilities may cause issues with inaccurate readings from sensors within the cavity as the pressure and/or temperature of air within the cavity does not accurately reflect the properties of the external environment.

One solution to this problem is to design multiple ports in the housing that fluidly couple the external environment to the cavity within the housing. A barometric vent is fluidly coupled to the external environment through a first port in the housing. A sensor, such as a pressure transducer, is fluidly coupled to the external environment through a second port in the housing. The first port is isolated from the second port such that fluid in the first port is not coupled to fluid in the second port except through the external environment. The sensor included in the second port is not isolated from the external environment from the barometric vent utilized to equalize the fluid in the main cavity of the housing. Consequently, the sensor must be capable of handling contact with water that enters the second port, or the sensor should be isolated from the external environment in the second port by a second barometric vent. With the sensor measuring a characteristic of a fluid that is decoupled from the cavity regulated by the primary barometric vent, the design of the primary barometric vent can be modified to increase the water resistance of the device independent of the accuracy of the sensor. This allows the depth rating of the device to be increased substantially without negatively impacting the readings of a pressure transducer.

These and other embodiments are discussed below with reference to FIGS. 1-8; however, those skilled in the art will readily appreciate that the detailed description given herein with respect to these figures is for explanatory purposes only and should not be construed as limiting.

FIG. 1 illustrates a portable electronic device 100, in accordance with some embodiments. The portable electronic device 100 is a mobile phone that includes a housing 102, a display assembly 104, a connector port 106, a speaker 108, various openings 110, and interface elements 112. The housing 102 can include a substrate having a cavity formed therein. The housing 102 can be formed of metal, plastic, ceramic, or any combination thereof. The housing 102 can be machined, forged, molded, extruded, or otherwise formed by a combination of techniques. In some embodiments, the housing 102 is machined from an aluminum billet and includes a number of structures formed therein. A main structure is an opening in a surface of the aluminum billet that leads to a cavity. Operational components of the portable electronic device 100 can be disposed within the cavity.

The display assembly 104 is secured to the housing 102, at least in part, by one or more mechanical fasteners 114 disposed through an opening in the side of the housing 102. In some embodiments, the mechanical fasteners 114 can be omitted and the display assembly 104 is secured to the housing entirely by adhesive or hidden fasteners that are not visible on an external surface of the housing.

In some embodiments, the connector port 106 is an opening in a surface of the housing 102 that accepts a male connector attached to a cable having a number of conductors. A female connector is disposed in the connector port, enabling power and/or data signals to be provided to components disposed within the housing 102.

In some embodiments, the display assembly 104 includes a display unit such as a liquid crystal display (LCD) layer disposed over a backlight. Alternatively, the display unit can be an organic light emitting diode (OLED) display that does not include a backlight. The display assembly 104 can also include one or more touch sensors for detecting touch input on a surface of the display assembly 104. In some embodiments, the display assembly 104 is overlaid by a glass substrate that can be adhered to a top surface of the display assembly 104. The glass substrate can include an opening located proximate the speaker 108.

The portable electronic device 100 can include a speaker 108 located near a top edge of the housing 102. The speaker 108 is capable of reproducing an audio signal such that a user can listen to a voice call by placing the speaker proximate the user's ear. Although not shown explicitly, the speaker 108 can be included in an assembly that also includes a receiver (e.g., an antenna and signal circuitry for receiving radio frequency wireless signals), a front-facing camera (e.g., a lens assembly disposed over an image sensor), a depth sensor, a microphone, and/or various additional components included proximate the top edge of the housing 102.

The portable electronic device 100 can include interface elements 112, such as buttons, disposed within openings in a surface of the housing 102. For example, the buttons shown in FIG. 1 can be pressed by a user to increase or decrease a volume of the speaker 108. Although only two buttons are shown in FIG. 1, it will be appreciated that additional interface elements 112 can be included along one or more surfaces of the housing 102. For example, a button or switch can also be included on the surface of the housing 102 to toggle a muted mode of operation. A button or switch can also be included on the same or a different surface of the housing 102 to toggle a power supplied to the components of the device.

Figure 2:
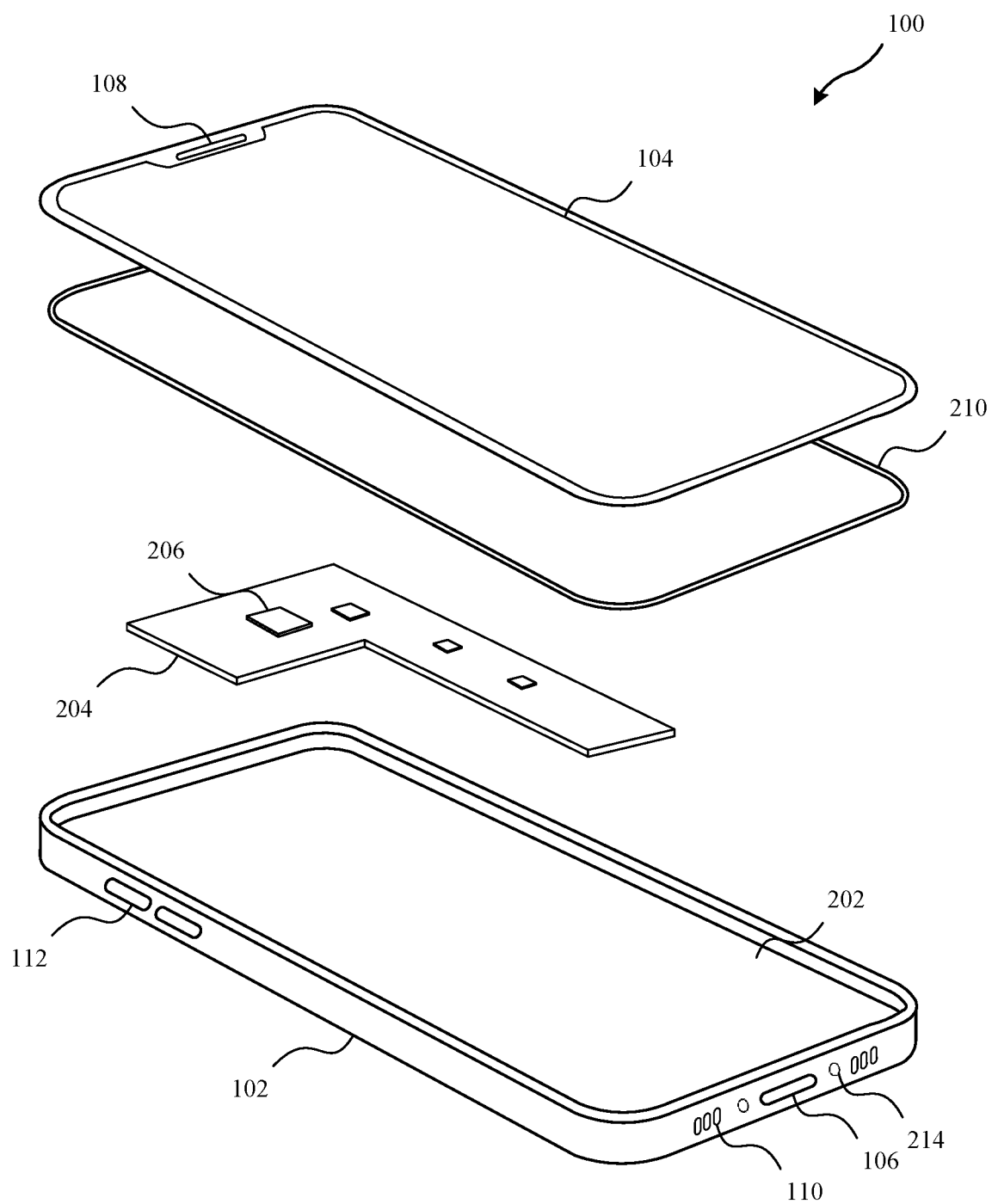
FIG. 2 is an exploded view of various components of the portable electronic device of FIG. 1, in accordance with some embodiments.

FIG. 2 is an exploded view of various components of the portable electronic device 100 of FIG. 1, in accordance with some embodiments. The exploded view depicts operational components 206 disposed on a printed circuit board 204. The printed circuit board 204 is enclosed within a cavity 202 formed in the housing 102. The cavity 202 is sealed using an adhesive 210 that surrounds a perimeter of an edge of the cavity 202. The adhesive 210 forms a bond between one or more surfaces of the housing 102 and corresponding surface(s) of the display assembly 104.

The operational components 206 can include various integrated circuit packages as well as electrical components soldered to the printed circuit board 204. In some embodiments, the operational components 206 can include a processor, memory, microelectromechanical systems (MEMS) devices, a system-on-chip (SoC), capacitors, resistors, inductors, and the like. Although not shown explicitly, the portable electronic device 100 can include two or more printed circuit boards connected by flexible connectors, each printed circuit board including a different subset of the operational components 206. The portable electronic device 100 can also include an energy storage device, such as a lithium-ion battery, as well as additional components such as haptic feedback systems.

In some embodiments, the cavity 202 is sealed by the adhesive 210 to protect the operational components 206 from water damage. Water in contact with electrical components can cause short circuits, leading to electrical damage, or possible corrosion of signal traces or contacts. However, sealing a gas in a container can lead to structural failures when a pressure differential occurs between the gas in the sealed container and the gas surrounding the sealed container. For example, pressure of the gas within the sealed container can increase when the temperature of the gas increases. Because the operational components generate heat, the gas needs the ability to bleed pressure into the external environment. As another example, the pressure of the external environment can drop due to, e.g., a change in altitude. The positive pressure differential between the gas in the cavity 202 and the gas in the external environment can force the display assembly 104 away from the housing 102, leading to a failure in the seal created by the adhesive 210. Breaking the seal can allow the ingress of water into the cavity 202. One solution to correct for this issue is to include a barometric vent in a port included in the housing between the cavity 202 and the external environment.

Figure 3:
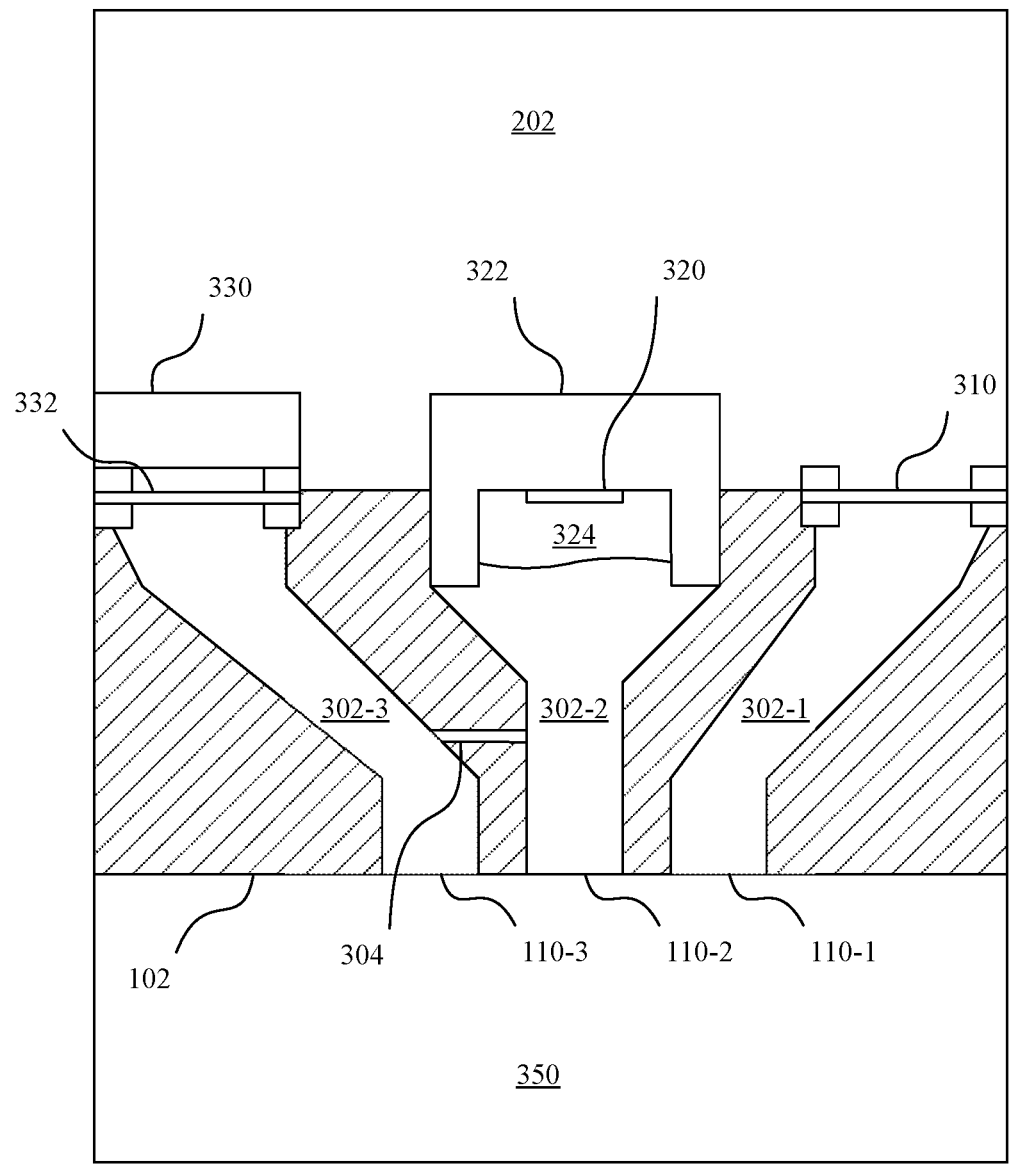
FIG. 3 illustrates a number of ports implemented in the housing of the portable electronic device, in accordance with some embodiments.

FIG. 3 illustrates a number of ports 302 implemented in the housing 102 of the portable electronic device 100, in accordance with some embodiments. Each port 302 refers to a cavity formed through a side wall of the housing 102. The housing 102 includes openings 110 in an external surface of the housing 102 that lead to the ports 302. Each port 302 also leads to a corresponding opening in an interior surface of the housing 102. Components can be disposed within each of the interior openings such that the cavity 202 is isolated from the external environment 350.

As depicted in FIG. 3, the cavity 202 is fluidly coupled to the external environment 350 via a primary barometric vent 310 disposed in a first port 302-1. A fluid, such as air, can pass through the first opening 110-1 to enter the first port 302-1. The barometric vent 310 includes a polytetrafluoroethylene (PTFE) membrane. The PTFE membrane is air-permeable, but is resistant to penetration by water due to the pore structure and hydrophobic characteristic of the PTFE membrane. In some embodiments, the PTFE membrane is laminated between structural components that include an opening therein. The PTFE membrane is disposed across the opening and sealed between the two structural components, which are then glued or otherwise fit into the opening in the housing 102. The port 302-1 is effectively sealed off from the cavity 202 except for any gas that permeates the PTFE membrane.

It will be appreciated that the barometric vent 310 is rated to a particular depth. Because the port 302-1 is open to the external environment 350 by way of the opening 110-1, water or other liquids can enter the port 302-1 when the portable electronic device 100 is submerged. While PTFE is hydrophobic, increasing the pressure of the water will force water through the PTFE membrane. Furthermore, a pressure differential between the gas in the cavity and the pressure of the liquid in the external environment 350 can rupture the PTFE membrane. Consequently, the barometric vent 310 merely resists the ingress of water into the cavity 202 up to a threshold depth. The depth rating of the barometric vent 310 can range between a few centimeters and many meters of water, where a surface of the water is at atmospheric pressure of one atmosphere.

Conventionally, a sensor would be placed in the cavity 202 behind the barometric vent 310. However, the rate of flow of gas through the PTFE membrane would affect the time constant associated with the sensor. The time constant refers to a characterization of a response time of a system to react to a step input. For example, a small barometric vent 310 would limit the rate of flow of a gas through the port 302-1, which can increase the time constant of a pressure transducer disposed within the cavity 202 because the pressure in the cavity 202 is correlated to the amount of gas (e.g., molecules of gas) in the cavity 202 at a given temperature. The flow rate through the PTFE membrane depends on a pressure differential of the gas on both sides of the PTFE membrane as well as the corresponding structure of the PTFE membrane and a cross-sectional area of the PTFE membrane. In other embodiments, the barometric vent 310 can comprise any air-permeable membrane that resists the penetration of a liquid.

In order to decouple the time constant of a sensor 320 from the design of the barometric vent 310, the sensor 320 can be fluidly coupled to the external environment 350 via a separate port 302-2. In other words, the sensor 320 measures a fluid in a separate cavity (e.g., the second port 302-2) that is different from the sealed cavity 202 that includes the operational components 206. In some embodiments, the volume of the port 302-2 is much less than a volume of the cavity 202, and the ratio of a cross sectional area of the opening 110-2 to the volume of the port 302-2 is greater than a ratio of a cross sectional area of the opening 110-3 to the volume of the cavity 202. Consequently, the time constant for the sensor 320 is reduced compared to a similar sensor isolated behind the barometric vent 310 in the cavity 202.

In some embodiments, the sensor 320 is a MEMS device mounted in a sensor housing 322. The sensor 320 can also be encased within a gel 324 to protect the sensor 320 from contact with water or any other corrosive fluids that can enter the port 302-2. The sensor 320 can be a pressure transducer configured to measure an atmospheric pressure of the gas in the external environment. The sensor 320 measures this atmospheric pressure indirectly by measuring a pressure of the gel 324, which is correlated to a pressure of the gas within the port 302-2. The gas in the port 302-2 is also fluidly coupled to the gas in the external environment 350 through the opening 110-2 in the external surface of the housing 102. The sensor 320 can be adhesively bonded to an interior opening in the housing 102 to seal the cavity 202 from the port 302-2. In other words, gas in the port 302-2 does not enter the cavity 202 and gas in the cavity 202 cannot exit through the port 302-2.

In other embodiments, the sensor 320 can be another type of sensor such as a temperature sensor, a hygrometer, an air pollution/particulate sensor (e.g., a carbon monoxide sensor), or any other type of sensor designed to measure a characteristic of a fluid (e.g., air) in the external environment 350.

In some embodiments, the port 302-2 can be fluidly coupled with another port 302-3 via fluid channel 304. A separate component 330 can be disposed in the port 302-3, but isolated behind a secondary barometric vent 332. The barometric vent 332 protects the component 330 from water but allows gas from the external environment to reach the component 330. In some embodiments, the component 330 is an audio transducer. The audio transducer can be either a speaker (e.g., converts electrical signals to sound waves) or a microphone (e.g., converts sound waves to electrical signals). In the case of a speaker, the sound generated by the audio transducer leaves the opening 110-3 and can be heard proximate the portable electronic device 100. Pressure changes in the fluid in the port 302-3 can be transferred to the fluid in the port 302-2 via the fluid channel 304 as well as through the fluid in the external environment 350.

It will be appreciated that the ports 302 are open to the external environment 350. Consequently, various fluids such as water can enter the ports 302 and impede the operation of the sensor 320. In some embodiments, the ports 302 are designed to have a specific geometry to promote liquid flow out of the port through the openings 110. For example, as depicted in FIG. 3, the walls of the port(s) 302 can be sloped to promote liquids draining from the port 302. In some embodiments, the walls of the port can also be coated with a hydrophobic coating to encourage water to drain from the port 302.

Figure 4:
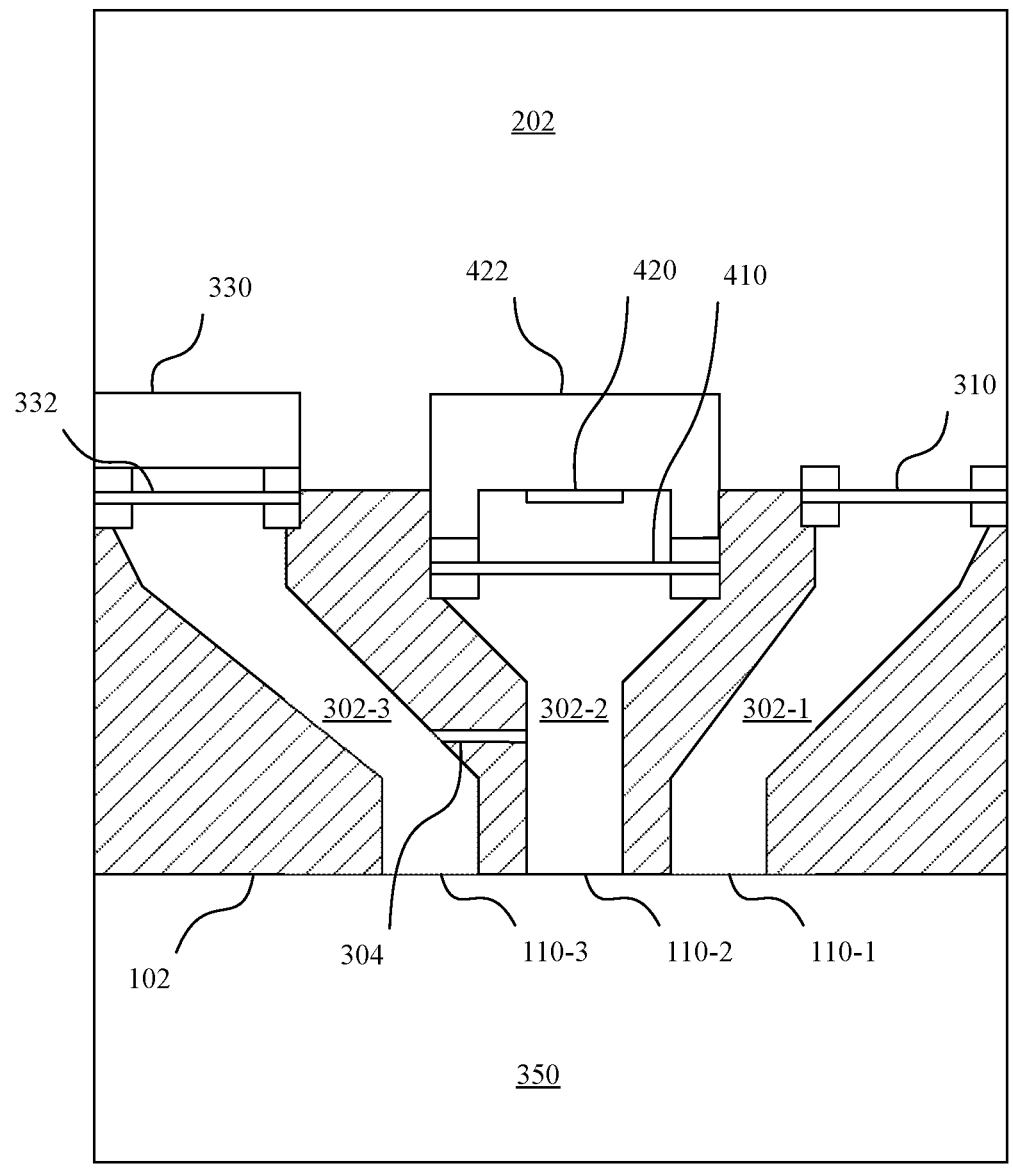
FIG. 4 illustrates a technique for keeping a sensor dry, in accordance with some embodiments.

FIG. 4 illustrates a technique for keeping a sensor 420 dry, in accordance with some embodiments. The sensor 320 depicted in FIG. 3 is capable of being wet because the sensor 320 is encased in the gel 324. However, some sensors should be kept dry. In such cases, a secondary barometric vent 410 can be disposed between the sensor 420 and the port 302-2. Again, the sensor 420 can be attached to a sensor housing 422 that is adhesively bonded to an interior opening in the housing 102 fluidly coupled to the port 302-2. The secondary barometric vent 410 can be similar to the primary barometric vent 310.

In some embodiments, the size of the primary barometric vent 310 can be different from the size of the secondary barometric vent 410 to meet different design expectations. For example, the secondary barometric vent 410 can be designed to tailor a time constant of the sensor 420 to a desired time constant, and the primary barometric vent 310 can be designed to enable venting of the gas within the cavity 202 responsive to a maximum rate of change in atmospheric pressure in the external environment 350 or a maximum depth rating for a desired submersible device. Decoupling the different design goals from the particular barometric vent can have benefits such as increasing the depth rating of a water-resistant portable electronic device from 1 meter to 6 meters.

Figure 5:
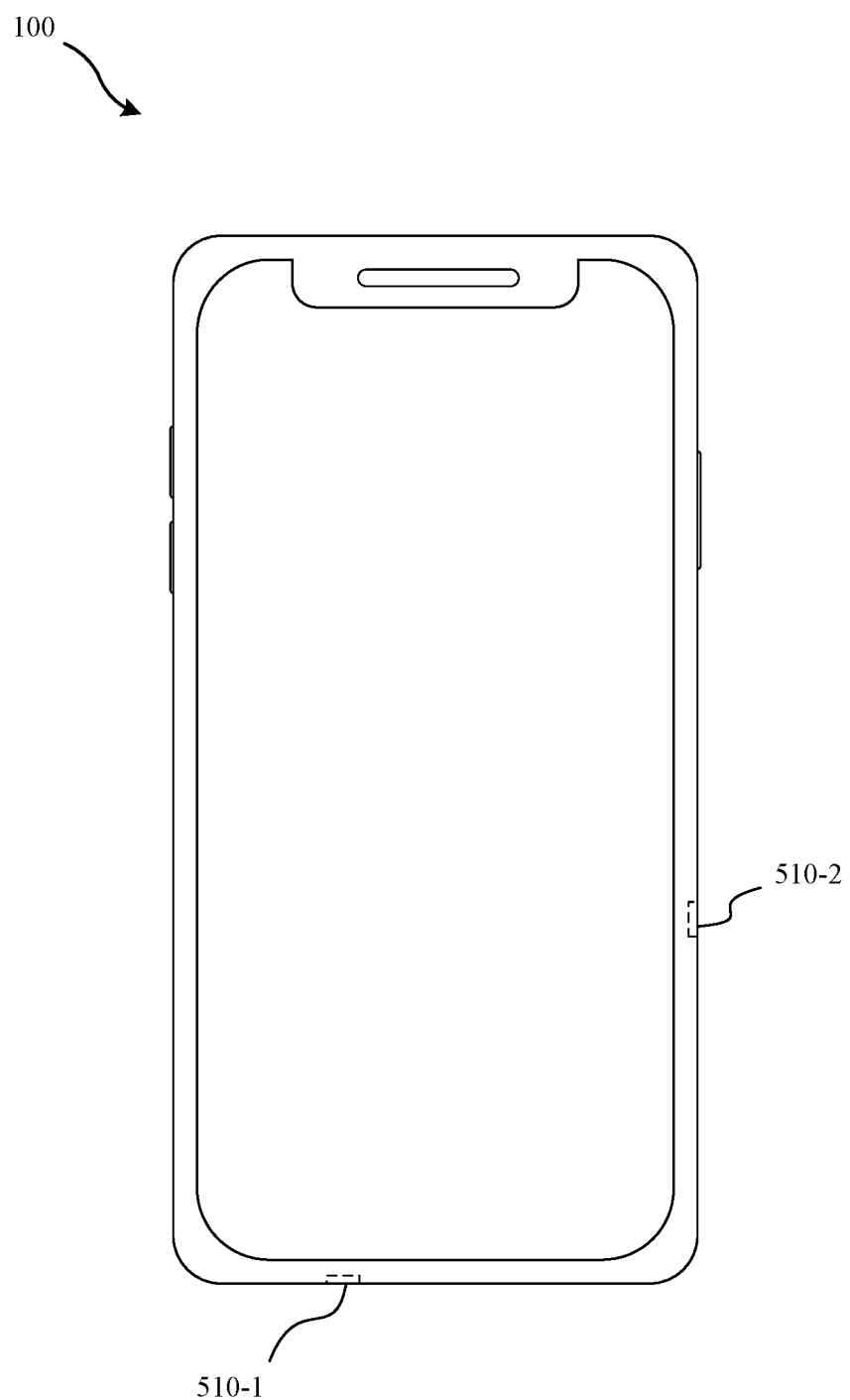
FIG. 5 illustrates an alternate arrangement of components relative to a housing of the portable electronic device, in accordance with other embodiments.

FIG. 5 illustrates an alternate arrangement of components relative to a housing of the portable electronic device 100, in accordance with other embodiments. Once the port 302-1 for the primary barometric vent 310 has been decoupled and isolated from the port 302-2 for the sensor 320, the location for the primary barometric vent 310 can be designed independently from the location for the sensor 320. For example, although the openings 110 in FIG. 1 illustrate three separate and distinct openings located adjacent each of the other two openings on a single face of the housing of the portable electronic device 100, each of the ports 302 can be fluidly coupled to the external environment 350 via a separate and distinct opening, located on any surface of the portable electronic device 100.

As depicted in FIG. 5, a first opening 510-1 can be located on a bottom surface 502 of the housing 102, and a second opening 510-2 can be located on a right surface 504 of the housing 102. The first opening 510-1 can lead into the first port 302-1 having the primary barometric vent 310 disposed therein, and the second opening 510-2 can lead into the second port 302-2 having the sensor 320 disposed therein. The location, size, and shape of the openings 510 can be designed independently to accommodate the different requirements of the different functions for each of the ports 302.

Figure 6:
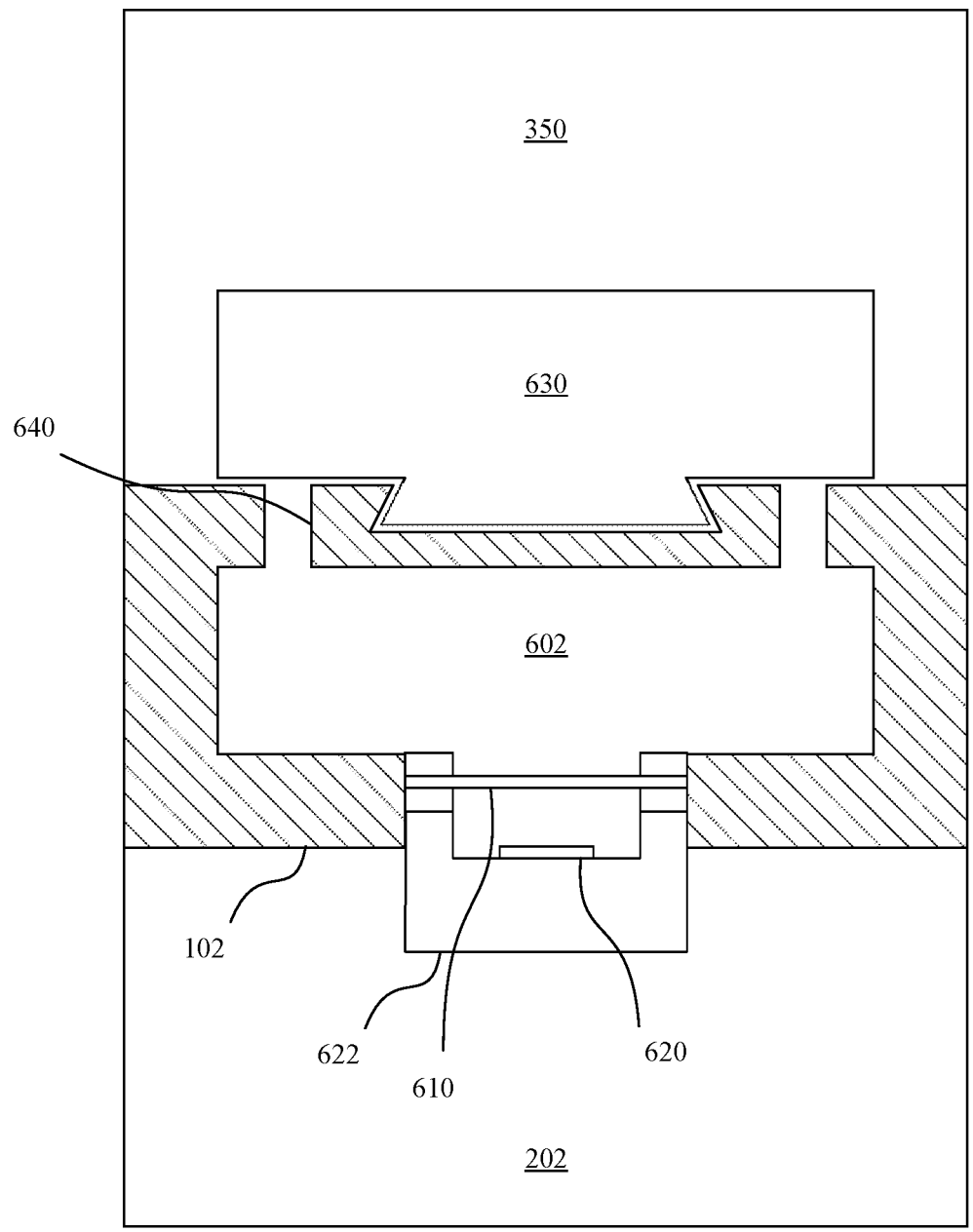
FIG. 6 illustrates a sensor disposed within a port located proximate a user interface element of the portable electronic device, in accordance with some embodiments.

FIG. 6 illustrates a sensor 620 disposed within a port 602 located proximate a user interface element 630 of the portable electronic device 100, in accordance with some embodiments. As depicted in FIG. 6, a user interface element 630, such as a switch or a button, can be disposed in an opening 640 in the housing 102. In some embodiments, the opening 640 may not be sealed, creating a port 602 behind the user interface element 630 within the housing 102. In some cases, a sensor 620 can be located in an opening of the housing 102 fluidly coupled to the port 602. The sensor 620 can be adhesively bonded to the opening in the housing 102, thereby isolating the fluid in the port 602 from the cavity 202. In some embodiments, a secondary barometric vent 610 can be disposed between the sensor 620 and the port 602. In other embodiments, the secondary barometric vent 610 can be omitted, and the sensor 620 can be encased in a gel such that the sensor 620 can be contacted by water or other corrosive liquids.

It will be appreciated that the sensor 620, like sensors 320 and 420, can be disposed in any port included in a wall of the housing 102 that is isolated from a separate and distinct port that includes the primary barometric vent 310 utilized to equalize the cavity 202 including the operational components 206 of the portable electronic device 100. Other examples for alternative locations of the sensor(s) 320, 420, and/or 620 include a port located proximate the speaker 108 or even a port implemented in the glass substrate overlaid on a top surface of the display assembly 104. Furthermore, in some embodiments, the portable electronic device 100 can include multiple sensors disposed in two or more separate and distinct ports isolated from a first port that includes the primary barometric vent 310. In some cases, two or more ports including different sensors can be fluidly coupled with a fluid channel 304.

Figure 7:
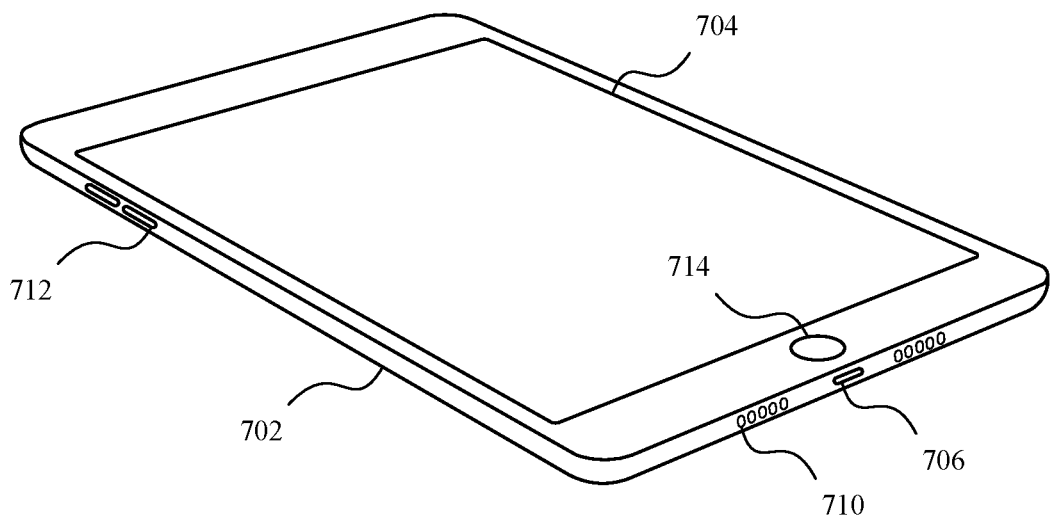
FIG. 7 illustrates a portable electronic device, in accordance with some embodiments.

FIG. 7 illustrates a portable electronic device 700, in accordance with some embodiments. The integrated sensors, as described in more detail above, can be implemented in other types of portable electronic devices in addition to a mobile phone. As depicted in FIG. 7, the sensor(s) 320, 420, and/or 620 and the primary barometric vent 310 can be implemented in a tablet device. The portable electronic device 700 includes a housing 702, a display assembly 704, a connector port 706, openings 710, and one or more user interface elements such as buttons 712 and touch sensitive home button 714. Similar to openings 110, openings 710 can lead to ports that include the primary barometric vent 310 and the sensor 320. Alternatively, sensor 420 or sensor 620 can be included in a port associated with opening 710 or button(s) 712.

It will be appreciated that the portable electronic device can also take the form of a laptop computer, wearable device (e.g., a watch), portable gaming device, or any other consumer electronic device that is portable and includes a sealed cavity to prevent water incursion into the device.

Figure 8:
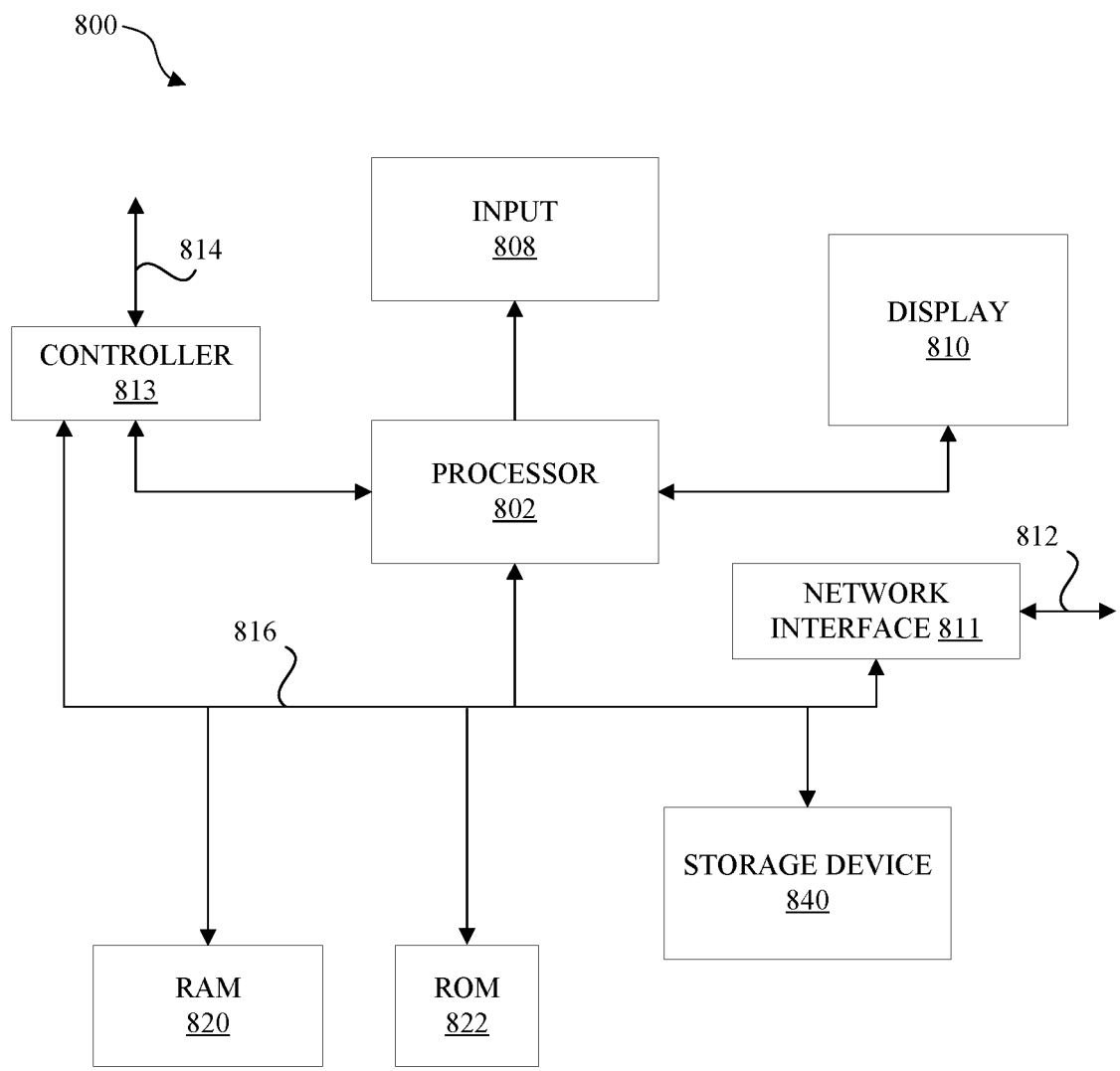
FIG. 8 illustrates a detailed view of an exemplary computing device that can be used to implement the various apparatus and/or methods described herein, in accordance with some embodiments.

FIG. 8 illustrates a detailed view of an exemplary computing device 800 that can be used to implement the various apparatus and/or methods described herein, in accordance with some embodiments. In particular, the detailed view illustrates various components that can be included in the computing devices illustrated in FIGS. 1 to 7 and/or described herein. For example, one or more of the portable electronic devices 100 or 700, or any other device including any network devices and/or consumer electronics, can include the components of computing device 800. For example, one or more of the components shown in FIG. 8 can be included in the cavity 202 of the portable electronic device 100 and isolated from the external environment 350 through the primary barometric vent 310.

As shown in FIG. 8, the computing device 800 can include a processor 802 that represents a microprocessor or controller for controlling the overall operation of computing device 800. The computing device 800 can also include a user input device 808 that allows a user of the computing device 800 to interact with the computing device 800. For example, the user input device 808 can take a variety of forms, such as a button, keypad, dial, touch screen, audio input interface, visual/image capture input interface, input in the form of sensor data, etc. Still further, the computing device 800 can include a display 810 (screen display) that can be controlled by the processor 802 to present visual information to the user. A data bus 816 can facilitate data transfer between at least a storage device 840, the processor 802, and a controller 813. The controller 813 can be used to interface with and control different equipment through an equipment control bus 814. The computing device 800 can also include a network/bus interface 811 that couples to a data link 812. In the case of a wireless connection, the network/bus interface 811 can include a wireless transceiver.

The computing device 800 also include a storage device 840, which can comprise a single disk or a plurality of disks (e.g., hard drives), and includes a storage management module that manages one or more partitions within the storage device 840. In some embodiments, storage device 840 can include flash memory, semiconductor (solid state) memory or the like. The computing device 800 can also include a Random Access Memory (RAM) 820 and a Read-Only Memory (ROM) 822. The ROM 822 can store programs, utilities or processes to be executed in a non-volatile manner. The RAM 820 can provide volatile data storage, and stores instructions related to the operation of the computing device 800.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A portable electronic device comprising:
   a housing defining a sealed cavity;
   a component disposed within the sealed cavity;
   a barometric vent disposed in a first port defined by the housing and in communication with the sealed cavity, the barometric vent having a depth rating; and
   a sensor system comprising a sensor disposed in a second port defined by the housing and isolated from the first port, a time constant characterizing a response time of the sensor system being substantially decoupled from the depth rating.

2. The portable electronic device of claim 1, wherein the sensor is positioned between the sealed cavity and a secondary barometric vent in the second port, the secondary barometric vent configured to prevent liquid from contacting the sensor.

3. The portable electronic device of claim 1, wherein the component disposed within the sealed cavity comprises one or more of:
   a processor;
   a memory;
   a printed circuit board; or an energy storage device.

4. The portable electronic device of claim 1, wherein the second port is fluidly coupled to a third port via a fluid channel, an audio transducer is disposed within the sealed cavity, and a secondary barometric vent is disposed between the third port and the audio transducer.

5. The portable electronic device of claim 1, wherein the barometric vent comprises a polytetrafluoroethylene (PTFE) membrane.

6. The portable electronic device of claim 1, wherein the sensor is a temperature sensor.

7. The portable electronic device of claim 1, wherein the second port is located proximate a user interface element disposed in an opening of the housing of the portable electronic device.

8. The portable electronic device of claim 1, wherein the sealed cavity is sealed with an adhesive disposed between a surface of the housing and a corresponding surface of a display assembly of the portable electronic device.

9. The portable electronic device of claim 1, wherein the sensor is a pressure transducer.

10. The portable electronic device of claim 9, wherein the pressure transducer is a microelectromechanical system (MEMS) device encased in a gel.

* * * * *